US009876991B1

(12) United States Patent
Ray et al.

(10) Patent No.: US 9,876,991 B1
(45) Date of Patent: Jan. 23, 2018

(54) HIERARCHICAL KEY MANAGEMENT SYSTEM FOR DIGITAL RIGHTS MANAGEMENT AND ASSOCIATED METHODS

(71) Applicant: Concurrent Computer Corporation, Duluth, GA (US)

(72) Inventors: David Leon Ray, Johns Creek, GA (US); James Wesley Bell, Plano, TX (US)

(73) Assignee: Concurrent Computer Corporation, Duluth, GA (US)

( * ) Notice: Subject to any disclaimer, the term of this patent is extended or adjusted under 35 U.S.C. 154(b) by 367 days.

(21) Appl. No.: 14/193,713

(22) Filed: Feb. 28, 2014

(51) Int. Cl.
  *H04N 7/167* (2011.01)
  *H04N 21/266* (2011.01)
  *H04N 21/435* (2011.01)

(52) U.S. Cl.
  CPC ..... *H04N 7/1675* (2013.01); *H04N 21/26606* (2013.01); *H04N 21/435* (2013.01)

(58) Field of Classification Search
  CPC ........... H04N 7/1675; H04N 21/26606; H04N 21/435; H04L 9/00; H04L 9/32; H04L 63/062; H04L 2463/101; G06F 21/10; G06F 21/60
  See application file for complete search history.

(56) References Cited

U.S. PATENT DOCUMENTS

| 7,058,639 | B1 * | 6/2006 | Chatterjee ........... G06F 17/3033 |
| 7,171,558 | B1 | 1/2007 | Mourad et al. |
| 7,401,231 | B2 | 7/2008 | Taki et al. |
| 7,404,082 | B2 | 7/2008 | Medvinsky et al. |
| 7,421,081 | B2 | 9/2008 | Zhang et al. |
| 7,644,445 | B2 | 1/2010 | Zhu et al. |
| 7,827,613 | B2 | 11/2010 | Koved et al. |

(Continued)

FOREIGN PATENT DOCUMENTS

| CA | 2626244 | 4/2007 |
| EP | 2141625 | 1/2010 |

(Continued)

OTHER PUBLICATIONS

"White Paper", "Broadcast Encryption with Multiple Trust Authorities"; By Kent D. Boklan, Alexander W Dent, and Christopher A Seaman; Published 2010.

(Continued)

*Primary Examiner* — Benjamin R Bruckart
*Assistant Examiner* — Susan X Li
(74) *Attorney, Agent, or Firm* — Philip H. Burrus, IV

(57) ABSTRACT

An intermediate server (104) is operable in a distributed key management system (300). The intermediate server comprises one or more processors (205) and an intermediate key material repository (302) to store digital rights management key material. The intermediate server can be operable in the system between a master server (101) and a local server (106), with the local server to deliver content (108) to one or more subscriber devices (109,110). The intermediate server, or optionally a management system (117) can prepopulate the intermediate key material repository with one or key material (1005) corresponding to fragments (1001) of the content prior to the fragments of content being requested by the one or more subscriber devices.

14 Claims, 12 Drawing Sheets

(56) References Cited

U.S. PATENT DOCUMENTS

| | | |
|---|---|---|
| 7,933,410 B2 | 4/2011 | Fahrny |
| 8,045,713 B2 | 10/2011 | Lain et al. |
| 8,321,950 B2 | 11/2012 | Oran |
| 8,411,865 B2 | 4/2013 | Kim |
| 8,452,016 B2 | 5/2013 | Robert et al. |
| 2003/0093694 A1* | 5/2003 | Medvinsky ........... G06Q 20/367 726/6 |
| 2005/0187879 A1 | 8/2005 | Zigmond et al. |
| 2006/0177066 A1 | 8/2006 | Han et al. |
| 2007/0050293 A1* | 3/2007 | Peterka ................. G06F 21/10 705/50 |
| 2007/0168048 A1 | 7/2007 | Allen et al. |
| 2010/0054479 A1 | 3/2010 | Kao et al. |
| 2011/0038479 A1* | 2/2011 | Bilodi .................. H04L 9/0891 380/45 |
| 2011/0228942 A1 | 9/2011 | Fahrny et al. |
| 2011/0231660 A1* | 9/2011 | Kanungo ............... H04N 7/165 713/168 |
| 2012/0221853 A1 | 8/2012 | Wingert et al. |
| 2014/0282689 A1* | 9/2014 | Kummer ............ H04N 21/4408 725/31 |

FOREIGN PATENT DOCUMENTS

| | | |
|---|---|---|
| GB | 2444338 | 6/2008 |
| JP | 2012-050028 | 3/2012 |
| JP | 2012-230454 | 11/2012 |
| WO | 2006055853 | 5/2006 |

OTHER PUBLICATIONS

"White Paper", Privacy Protection for Signed Media Files: A separation-of-duty Approach to the Lightweight DRM (LWDRM) System; By Rudiger Grimm and Patrick Aichroth; Published 2004.

"White Paper", "Public Key Broadcast Encryption for Stateless Receivers"; By Yevgeniy Dodis and Nelly Fazio; Published Aug. 1, 2002.

"White Paper", DRM Protected Dynamic Adaptive HTTP Streaming; By Frank Hartung, Sinan Kesici, and Daniel Catrein; Published 2011.

* cited by examiner

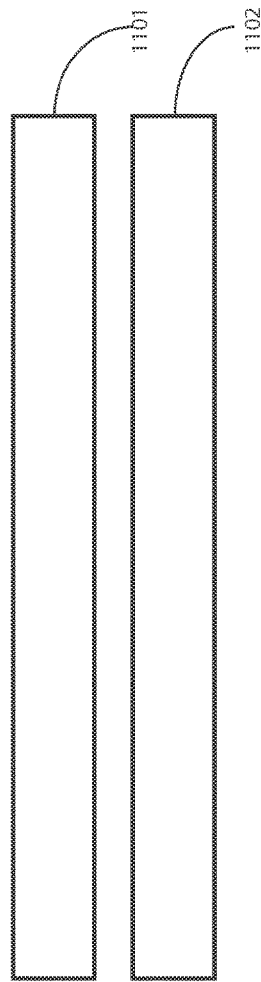
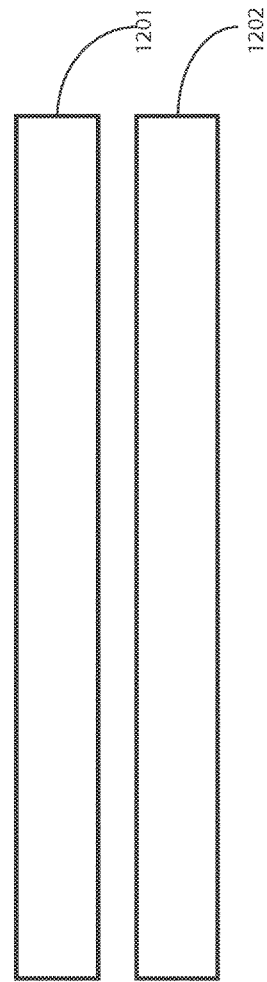
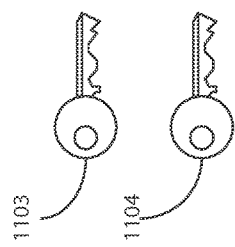
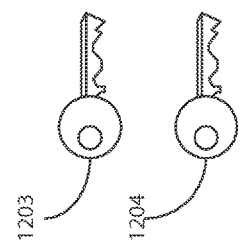
FIG. 11
FIG. 12

US 9,876,991 B1

HIERARCHICAL KEY MANAGEMENT SYSTEM FOR DIGITAL RIGHTS MANAGEMENT AND ASSOCIATED METHODS

BACKGROUND

Technical Field

This disclosure relates generally to content management systems, and more particularly to content management systems incorporating digital rights management features.

Background Art

Delivery of electronic content to consumption devices, such as televisions, set-top boxes, mobile devices, computers, and media players has changed the way that users enjoy music, movies, and other works of art. As electronic devices and systems have become more sophisticated, downloadable content has come to supplant traditional media formats such as tapes, compact discs, digital video discs, and the like. Using music as one example, not too long a go a person who wanted to listen to a new song had to travel to a record store to buy a vinyl record, tape, or compact disc. They then had to have an appropriate player with which to listen to the song. For instance, a person who purchased a compact disc placed this disc into a compact disc player and, finally, was able to listen to the song.

By contrast, with new electronic delivery systems, a user simply downloads the desired song with a few clicks of a mouse. That song is then instantly playable on a variety of general-purpose media player devices. In addition to music, pictures, videos, games, software, and other applications are being transferred from provider to consumer via electronic downloads.

Vendors of content frequently take steps to ensure their intellectual property is protected during the downloading process. Singers, songwriters, moviemakers, and other artists want to ensure that their copyright protections are the same in the world of downloaded content as they were during the days of physical media. While an authorized purchaser should be able to enjoy the content, the copyright holder desires a way to prevent unauthorized copying of the content. This desire is heightened given that, with the advent of computers and other portable electronic devices, making copy is as simple as editing a word processing document.

Digital rights management refers to systems and technologies that have the purpose of providing copyright holders a mechanism for controlling the vast number of pieces of content in existence. Digital rights management systems can use various mechanisms for protection against unauthorized copying, including content authentication, authorization, rights verification, rights enforcement, and content protection. Many digital rights management tools include encryption and decryption algorithms, some of which rely on public and private "keys."

With simple encryption, an encrypted file is transferred to a user with a password. The user may download the file, but is unable to access its contents until a password is entered. A problem with simple encryption is that it allows the user—after having opened the file with the password—to freely make copies and transfer the file.

To solve this problem, many content providers use encryption and decryption algorithms based upon a rights management object known as a "key." Using such a system, a user receives an encrypted content file and a key. The key is used to access the content of the encrypted content file by decrypting or unlocking the content file. While a user can freely transfer the encrypted file, it can only be accessed with the key. Unless a second user has the key, the encrypted file is useless. As there is only one key, only one user can access the encrypted file at any one time.

When a single content provider has hundreds of thousands of contents under its control, using a key-based system requires the management of hundreds and thousands of digital keys. Management of all these keys can be difficult. Moreover, many downloading systems allow users to rent content rather than purchase it. When users rent instead of purchase, keys must not only be downloaded, but returned as well. This can be difficult. It would be advantageous to have an improved digital rights management system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 11 illustrates another explanatory content portions and corresponding key material in accordance with one or more embodiments of the disclosure.

FIG. 12 illustrates yet another explanatory content portions and corresponding key material in accordance with one or more embodiments of the disclosure.

Figure 1:
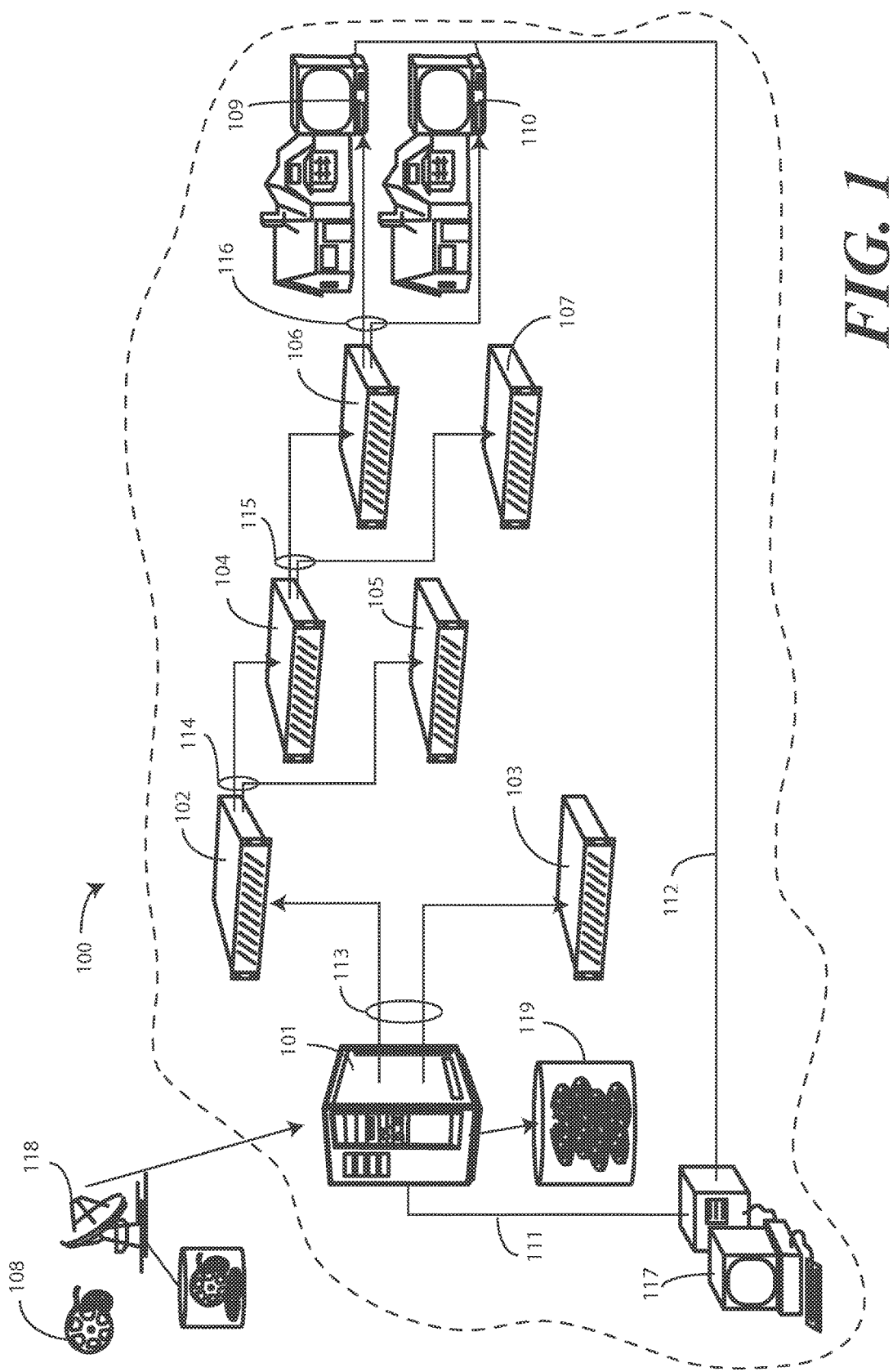
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to digital rights management in a distributed network. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of digital rights management in a distributed system as described herein. The non-processor circuits may include, but are not limited to, a satellite transmission device, content storage devices, network signal drivers, clock circuits, power source circuits, and user input devices. As such, these functions may be interpreted as steps of a method to perform digital rights management in a distributed system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

A content service provider may be required to manage the protection of hundreds of thousands of digital assets simultaneously for its customer base. In many instances, each asset must be protected universally for all users. In other cases, each asset must be protected for a particular user. The management of both public and private keys in a distributed system causes numerous technical and business challenges for the service provider. For example, any repository storing keys must be large enough to hold all possible keys that may be needed at any time to satisfy a user's request for protected content. Further, such repositories should be economical when deployed across the many facilities and servers maintained by the service provider. Next, embodiments of the disclosure contemplate that acquisition of keys from the repository must be performed in a timely manner to meet the timeout limitations of content protection technologies. Timely key deployment is also necessary to provide users with a satisfactory content usage experience.

Embodiments of the present disclosure provide a distributed system that addresses the concerns enumerated in the preceding paragraph. In one embodiment, a distributed content management system also includes a distributed key management system. The distributed key management system includes, in one or more embodiments, a hierarchical set of distributed repositories of keys. Using embodiments of the system, keys are quickly and efficiently managed across many different server nodes in many different locations.

In one embodiment, an intermediate server is operable in a distributed key management system. The intermediate server comprises one or more processors and an intermediate key material repository to store digital rights management key material, which is operable with the one or more processors. The intermediate server can be coupled between a master server and a local server in one or more embodiment, with the local server to deliver content to one or more subscriber devices. The intermediate server can be configured to pre-populate the intermediate key material repository with one or more key material corresponding to fragments of the content prior to the fragments of content being requested by the one or more subscriber devices. The pre-population occurring in the intermediate key material repository can occur in the master key repository or local key repositories as well.

In one embodiment of a method, a management system or the intermediate server itself can execute a method pre-populating, using the one or more processors of the intermediate server, an intermediate key material repository with one or more digital rights management keys corresponding to portions of content. In one or more embodiments, the pre-populating occurs without request for the portions of content from local servers operable with the intermediate server. The pre-population method occurring in the intermediate key material repository can occur in the master key repository or local key repositories as well.

In one embodiment, a distributed key management system includes a master server, one or more intermediate servers, and one or more local servers. The master server can be operable with a master key material repository for receiving key material from a vendor key management server. The one or more local servers can be operable with local key material repositories to deliver keys with content to one or more subscriber devices. Each intermediate server can be operable with an intermediate key repository. The management system, or alternatively the intermediate server itself, can pre-populate one or more intermediate key repositories with one or more digital rights management keys corresponding to fragments of content prior to the fragments of content being requested by a subscriber device.

Turning now to FIG. 1, illustrated therein is a distributed content management system 100 configured in accordance with one or more embodiments of the disclosure. One or more servers 101,102,103,104,105,106,107 of the distributed content management system 100 are capable of storing content 108, such as video content, audio content, combinations thereof, or other forms of content. In one or more embodiments the servers 101,102,103,104,105,106,107 are video servers that can be used to store, manage, and deliver the content 108 in the form of video content files across an interactive network to one or more subscriber devices 109, 110 in response to user requests.

In one embodiment, the content 108 is classified as either video on demand content or live content. Video on demand content is fully encoded and available in advance of its request by a subscriber device 109,110. Video on demand content is generally of fixed duration and fixed size, and may be partitioned into one or more static fragments. As will be described in more detail below, each static fragment may have associated therewith digital rights management key material. The number of static fragments can be calculated based upon the frequency of change in key material for the duration of the video on demand content. Different fragments of video on demand content may be requested simultaneously by different subscriber devices 109,110.

By contrast, live content is encoded in real-time and only partially available in advance of its request by a subscriber device 109,110. Live content is not necessarily of fixed duration and fixed size, and it may be partitioned into one or more dynamic fragments. If it is partitioned into more than one dynamic fragment, the number of dynamic fragments cannot be calculated unless the live content has a fixed duration. Only the current fragment of a live content may be requested simultaneously by different subscriber devices 109,110.

In one or more embodiments, the servers 101,102,103, 104,105,106,107 store the content 108 in one or more storage devices coupled to and operable with the servers 101,102,103,104,105,106,107. The interactive networks 111,112,113,114,115,116 across which the components of the distributed content management system 100 communicate may be any type of network capable of transferring data electronically such as, but not limited to, cable networks, ATM networks, the Internet, wireless networks, Telco networks, satellite networks, or any combination thereof. Subscriber devices 109,110 are devices used by end-users to specify the desired video content and/or to receive the video content for viewing. Examples of subscriber devices 109, 110 include, but are not limited to, televisions, set-top boxes, personal computers, tablet computers, mobile communication devices, and so forth. The various components of the system provide the managing, processing, and modulation, as appropriate, for the delivery of the content 108 across the interactive networks 111,112,113,114,115,116 to the subscriber devices 109,110.

In one or more embodiments, the servers 101,102,103, 104,105,106,107 are arranged in a distributed architecture such that multiple video servers are distributed throughout the distributed content management system 100. As shown in FIG. 1, in one embodiment one or more servers 101 may serve as a centrally located, "library" server, which may be also known as a "master" or "central" server. In one or more embodiments, the library server serves content 108 to an intermediate tier or tiers of servers 102,103,104,105, which are referred to as "intermediate" or "region" servers. These intermediate servers then serve the content 108 to a set of servers 106,107 disposed closer to the subscriber devices 109,110 than either the library server or the intermediate servers. These servers 106,107, which can be referred to as "edge" or "node" or "local" servers, in turn supply the content 108 through one or more streaming servers to one or more of the subscriber devices 109,110. It should be noted that the number of servers located at different locations is by way of example only and may vary depending upon the particular requirements of the network and may include additional or fewer servers, such as hub servers between the intermediate servers and the local servers.

As shown in FIG. 1, a management system 117 can be configured to manage the storage of the content files across the distributed content management system 100. In one or more embodiments, the management system 117 is coupled to and in communication with the master server 101 to coordinate receipt, storage, and maintenance of the content files. In one or more embodiments, the management system 117 is capable of receiving and processing up-stream information received from subscribers, as well as storing and maintaining such information.

One or more content providers 118 provide content 108 to the distributed content management system 100. The term "provider" is used broadly herein and is intended to identify any entity, other than the network operator, that has a connection to the network, and can provide input to the network or control the operation of the network. The content 108 can be provided in a variety of ways. For example, the distributed content management system 100 may receive RF signals by satellite, ATM data over ATM networks, local feeds and other information via terrestrial link. The content 108 is received, processed, and reformatted as necessary. For example the content 108 may be received in digitally compressed format and demultiplexed by a demultiplexer and stored in any convenient format or formats, such as MPEG, MPEG2, or MPEG4, but the present invention is not limited to these formats. As noted above, the content 108 can comprise any type of data, but for ease of illustration will be referred to as video content, as well as associated audio content, metadata, or other content, suitable for use in a video streaming or video-on-demand session. It will be clear to those of ordinary skill in the art having the benefit of this disclosure that other types of content could be used with the systems, methods, and devices described herein.

In one or more embodiments, the management system 117 manages the storage of the content 108 across the distributed content management system 100. For example, the management system 117 can store the content 108 in a local repository 119. The management system 117 is also operable with the intermediate servers 102,103,104,105 and the local servers 106,107. Accordingly, the management system 117 can arrange the storage of content 108 on the intermediate servers 102,103,104,105 and/or the local servers 106,107 by replicating the content 108 stored in the local repository 119 in the intermediate servers 102,103,104,105 and/or the local servers 106,107. The management system 117 is further configured to prepare and ingest the received content 108 for storage.

Figure 2:
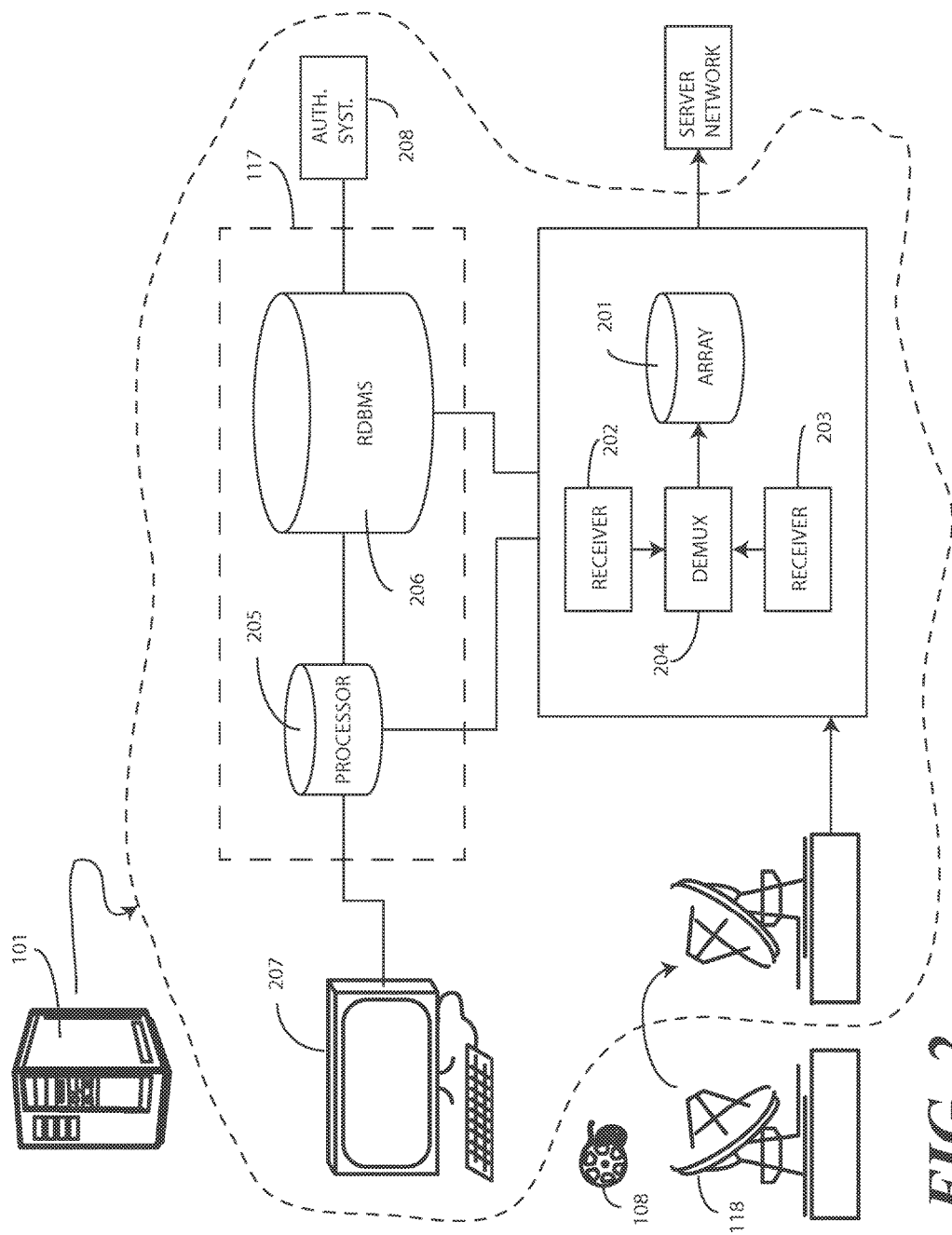
FIG. 2 illustrates one explanatory system component in accordance with one or more embodiments of the disclosure.

Turning now to FIG. 2, illustrated therein are various server components. For ease of illustration, the server components will be described in reference to the master server 101. However, the intermediate servers (102,103,104,105) and the local servers (106,107) may have similar components as well.

The various components may include a content storage device, such as a disk array 201, which may be a JBOD (just a bunch of disks) or RAID (redundant array of inexpensive disks) with various architectures and interfaces, such as FC-AL (Fiber Channel-Arbitrated Loop) or SSA (Serial Storage Architecture). The components may also include one or more receivers 202,203 for receiving content 108 from content providers 118. The receivers 202,203 can include DHEI (DigiCable Headend Expansion Interface) receivers or ATM (Asynchronous Transfer Mode) receivers. Demodulating and demultiplexing circuitry 204 may also be included.

One explanatory embodiment of the management system 117 is also shown in FIG. 2. In one or more embodiments the management system 117 includes one or more processors 205 and a relational database management system 206. The relational database management system 206 can function, in one or more embodiments, as a server or storage device. The storage devices of the relational database management system 206 can contain a listing or table of one or more of the following: the content providers, the subscribers, the servers upon which the content is located, the orders, the purchase history of each subscriber, the content files, identification information related to the content files, data regarding the usage (demand) of the content, and as will be shown below records of key material. In one or more embodiments, the management system 117 is connected to a computer terminal 207 with which an operator can provide the appropriate input data and changes, and can control the operation of the management system 117.

In one or more embodiments, the management system 117 is coupled with an authorization system 208. The optional authorization system 208 can store information on the features, privileges, benefits, bonuses, space, tiers, etc., available to each subscriber and/or to each content provider. The authorization system 208 may be external to the management system 117, as shown, or may be included within the management system 117, such as part of the relational database management system 206. Thus, when a subscriber requests particular content, the management system 117 may interrogate the authorization system 208 to determine whether or not the subscriber is authorized to receive the content. If so, then the request may be approved. If not, then the request may be denied. Likewise, if a content provider wishes to store content, that request may be granted or denied, or may be granted only with certain restrictions, such as with respect to size or location.

Figure 3:
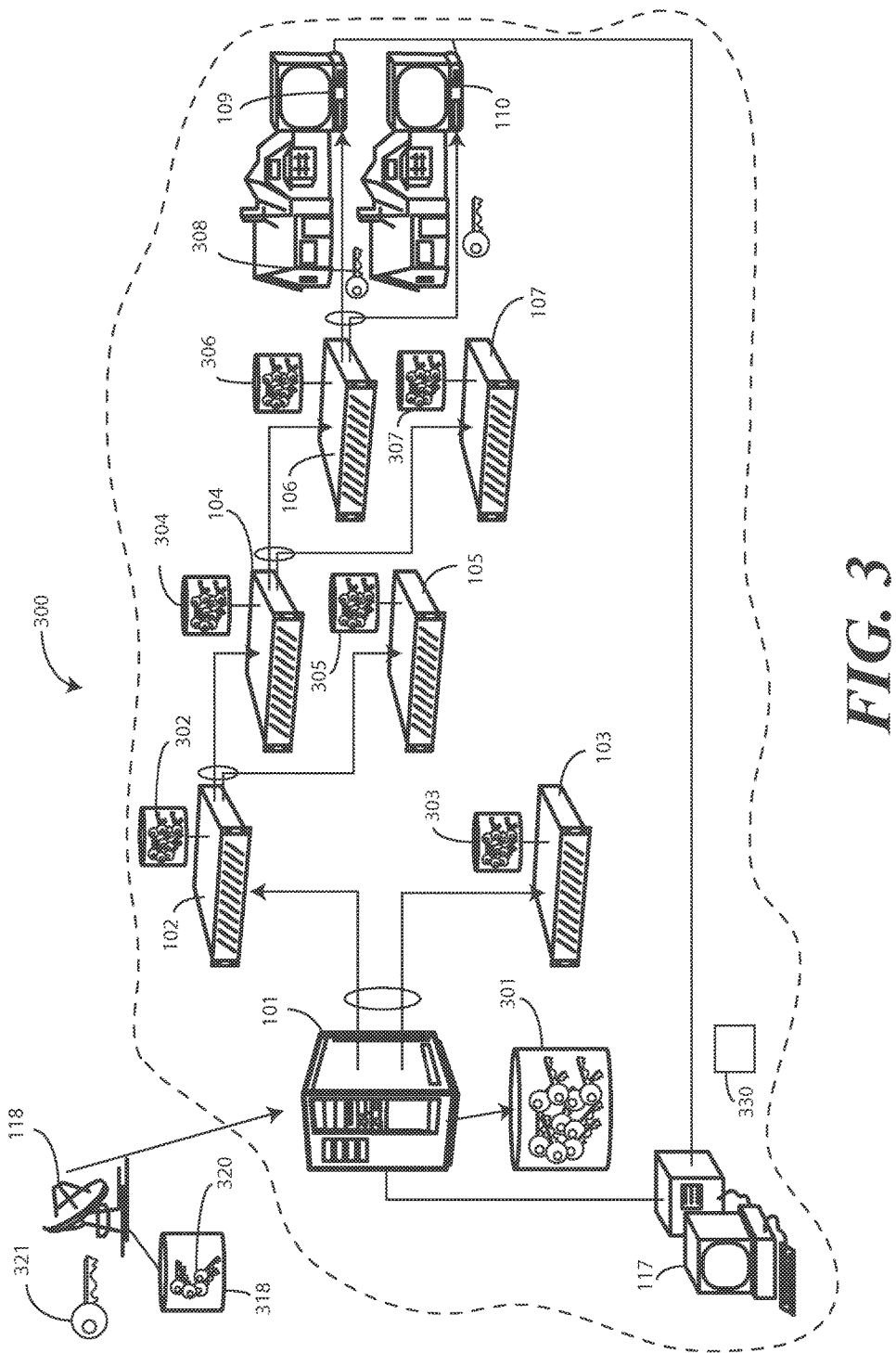
FIG. 3 illustrates one explanatory system in accordance with one or more embodiments of the disclosure.

As noted above, embodiments of the present disclosure provide a distributed system that addresses the copyright concerns by also including a distributed key management system. The distributed key management system includes, in one or more embodiments, a hierarchical set of distributed repositories of keys. Using embodiments of the system, keys are quickly and efficiently managed across many different server nodes in many different locations. Turning now to FIG. 3, illustrated therein is one example of such a distributed key management system 300 that can be used in conjunction with the distributed content management system (100) of FIG. 1.

In one embodiment, the content provider 118 has, in addition to content (108), a vendor key management server 318. The vendor key management server 318 can provide one or more vendor keys 320 for specific digital rights management methods of protecting the content (108) from unauthorized use, distribution, or copying. Where there are multiple content providers, each can include its own unique vendor key management server for distributing its keys.

In one embodiment, the master server 101 includes a master key material repository 301. The master key material repository 301 can serve as the reception interface to the vendor key management server 318 to provide an initial tier of the hierarchical repository of key material configured in accordance with one or more embodiments of the disclosure. For example, in one embodiment, vendor keys 320 can be received from the vendor key management server 318 and stored in the master key material repository 301. Records of vendor keys 320 and/or key material generated from the vendor keys 320 stored in the master key material repository 301 can be recorded in the relational database management system (206) of the management system 117. In one or more embodiments, each key record of the relational database management system (206) can include the following fields: Identification of the digital rights management content protection scheme; Identification of the content, including all fragments of the content, to be protected; The keys used in the protection of the content; The uniform resource identifier, if applicable, used for validation of the key material by the device; The positional starting time for the content fragment associated with the key material; The positional ending time for the content fragment associated with the key material; and The timestamp of the absolute time after which the key material is regarded as expired and no longer valid.

The master key material repository 301 can be divided into various portions. In one embodiment, the master key material repository 301 may include a cache reserved for that particular vendor. This "vendor cache" provides the master server 101 with quick access to vendor keys 320 in the event new key material needs to be generated from the vendor keys 320. Further, frequently and/or recently used key material requested by either the intermediate servers 102,103,104,105 and/or the local servers 106,107 may be held in a designated "key cache" of the master key material repository 301. The master key material repository 301 may be both redundant and resilient. However, in one or more embodiments it is exposed as a single entity to the sub hierarchy below it.

As with the master server 101, each of the intermediate servers 102,103,104,105 and/or the local servers 106,107 can include a corresponding key material repository. For example, the intermediate servers 102,103,104,105 can each include an intermediate key material repository 302,303, 304,305. Similarly, the local servers 106,107 can include local key material repositories 306,307. The intermediate key material repositories 302,303,304,305 can each be a set of one or more key material repositories in one or more hierarchical tiers. Frequently and/or recently used key material can be held in a subdivision of the intermediate key material repositories 302,303,304,305 known as the intermediate key material repository key cache. This key cache provides key material quickly in response to requests for the key material from a child repository.

The local key material repositories 306,307 can be a set of one or more key material repositories in a single hierarchical tier at the local server level. The local key material repositories 306,307, in one embodiment, are the first repositories accessed by the local servers 106,107 when key material needs to be delivered to a subscriber device 109, 110. Frequently and/or recently used key material is held in a subdivision of the local key material repositories 306,307 known as the local key material repository key cache. This key cache provides key material quickly in response to requests for the key material from local servers 106,107. In one or more embodiments, the local key material repositories 306,307 can be child repositories of the intermediate key material repositories 302,303,304,305. In other embodiments, the local key material repositories 306,307 can be child repositories of the master key material repository 301.

In one or more embodiments, the master key material repository 301, the intermediate key material repositories 302,303,304,305, and the local key material repositories 306,307 collectively comprise a hierarchical repository for key material. In this hierarchy, the parent of a local key material repository 306,307 is a corresponding intermediate key material repository 302,303,304,305. In one or more embodiments, both a primary parent and a backup parent may exist for each local key material repository 306,307.

For example, intermediate key material repository 304 may serve as the primary parent of local key material repository 306, while intermediate key material repository 305 serves as the secondary parent of local key material repository 306.

Similarly, the parent of an intermediate key material repository 302,303,304,305 may be either a different intermediate key material repository 302,303,304,305, or may be the master key material repository 301. As with the local key material repositories 306,307, both a primary parent and a backup parent may exist for an intermediate key material repository 302,303,304,305. Where the parent of the intermediate key material repository 302,303,304,305 is the master key material repository 301, as this is a single repository in one or more embodiments there will be no backup parent repository.

When a subscriber device 109,110 requests content 108 protected by a particular key 308, the particular key 308 must be delivered with the content 108. Where the subscriber device 109,110 does not possess the particular key 308, it requests the particular key 308 from the distributed key management system 300.

In one or more embodiments, in response to the request for the particular key 308, the local server 106,107 servicing the subscriber device 109,110 solicits the hierarchical repository of key material of the distributed key management system 300 for the requested particular key 308. In one embodiment, the local server 106,107 servicing the subscriber device 109,110 first searches a local key material repository 306,307 to fulfill the request for the particular key 308. If the local key material repository 306,307 has the requested particular key 308 material in its key cache, and if the particular key 308 is active and/or valid, the searched local key material repository 306,307 returns the requested particular key 308 to the requesting subscriber device 109, 110.

If the local key material repositories 306,307 do not have the particular key 308 in the key cache, the local server 106,107 selects and signals a parent key material repository, which in this case may be one of the intermediate key material repositories 302,303,304,305 or the master key material repository 301. Upon reception of valid key material from its parent repository, the local key material repository 306,307 stores the key material in its key cache, and the local key material repository 306,307 sends the particular key 308 to the requesting subscriber device 109,110.

If the local key material repository 306,307 has the particular key 308 in its key cache, but the particular key 308 is not valid, the local key material repository 306,307 first removes the particular key 308 from its key cache. Next, the local key material repository 306,307 selects and signals its parent repository, which may be an intermediate key material repository 302,303,304,305 or the master key material repository 301, with a request for the key material of the particular key 308. Upon reception of valid key material for the particular key 308 from a parent repository, the local key material repository 306,307 stores the key material in its key cache. The local key material repository 306,307 then sends the particular key 308 to the requesting subscriber device 109,110.

In one or more embodiments, the data flow algorithms for the intermediate key material repositories 302,303,304,305 are the same as the data flow algorithms for the local key material repositories 306,307, except the parent repository of an intermediate key material repository 302,303,304,305 may be a different intermediate key material repository 302,303,304,305 or the master key material repository 301. If the master key material repository 301 has the requested key material in its key cache, and the key material is valid, the master key material repository 301 returns the requested key material to its requesting child repository. If the master key material repository 301 does not have the key material in its key cache, the master key material repository 301 checks for the requested key material in the relational database management system (206). If the relational database management system (206) has the requested key material, and the key material is valid, the master key material repository 301 stores the key material in its key cache, and the master key material repository 301 sends the key material to its requesting child repository.

If the master key material repository 301 has the key material in its key cache, but the key material is not valid, the master key material repository 301 first removes the key material from its key cache, and then the master key material repository 301 checks for the requested key material in the relational database management system (206). If the relational database management system (206) has the requested key material, and the key material is valid, the master key material repository 301 stores the key material in its key cache, and the master key material repository 301 sends the key material to its requesting child repository.

If the relational database management system (206) does not have the requested key material when the relational database management system (206) is checked by the master key material repository 301, and the vendor cache has a vendor key, the master key material repository 301 removes the vendor key from the vendor cache, creates key material from the vendor key, and stores the key material in the database. If the relational database management system (206) does not have the requested key material when the relational database management system (206) is checked by the master key material repository 301, and the vendor cache does not have a vendor key, an error is raised.

As shown above, key material moves through the hierarchy of the distributed key management system 300 from master to intermediate to local repository on an as needed basis. Each child repository checks locally for requested keys. If they are not there, they request the key material from a parent, and so on, until the key material is found and is transferred to the requesting repository. While this system works well in practice, embodiments of the disclosure provide for anticipatory movement of key material so as to ensure meeting the timeout limitations of content protection technologies, as well as providing users with a satisfactory content usage experience.

Illustrating by example, in one or more embodiments the management system 117 can coordinate and/or request "pre-population" of key material in any one of the intermediate key material repositories 302,303,304,305. This allows a local server 106,107 to solicit and receive key material in a quicker and more seamless fashion.

In one or more embodiments, the management system 117 selects one or more of the intermediate key material repositories 302,303,304,305 to pre-populate keys that may be requested by local key material repositories 306,307 without any request for such keys from the local key material repositories 306,307. In response to this selection, and if the selected intermediate key material repository 302,303,304, 305 does not have the key material in its key cache, the selected intermediate key material repository 302,303,304, 305 selects and signals its parent repository, which may be another of the intermediate key material repositories 302, 303,304,305 or the master key material repository 301, with a request for the key material to be pre-populated. Upon reception of valid key material from its parent repository, the selected intermediate key material repository 302,303,304, 305 stores the key material in its key cache and sends an acknowledgement to the management system 117.

Periodically, the master key material repository 301 replenishes its vendor cache by obtaining vendor keys 320 from the vendor key management server 318. In one embodiment, this replenishment occurs when the master key material repository 301 is initiated or booted. In one or more embodiments, the replenishment can continue periodically while the distributed key management system 300 is in operation. Embodiments of the disclosure contemplate that access of the vendor key management server 318 can be time consuming. Accordingly, background replenishment of the vendor cache of the master key material repository 301 ensures that vendor keys 320 are available "just in time" for requests for newly generated key material from child repositories. In one or more embodiments, the master key material repository 301 may obtain and remove vendor keys from its vendor cache, for generation of key material, while replenishment of the vendor cache is ongoing in the background.

As noted above, content (108) is classified as either video on demand content or live content. Video on demand content is fully encoded and available in advance of its request by a subscriber device 109,110. Video on demand content is generally of fixed duration and fixed size, and may be partitioned into one or more static fragments. Different fragments of video on demand content may be requested simultaneously by different subscriber devices 109,110. Live content is encoded in real-time and only partially available in advance of its request by a subscriber device 109,110. Live content is not necessarily of fixed duration and fixed size, and it may be partitioned into one or more dynamic fragments. Only the current fragment of a live content may be requested simultaneously by different subscriber devices 109,110.

Each fragment of a particular content is associated with unique key material. A complete content, therefore, may be associated with a multiple set of key material, but each key material in a set is unique. The change in key material across the multiple fragments of content is the basis of the content protection feature commonly referred to as rotating keys.

Figure 4:
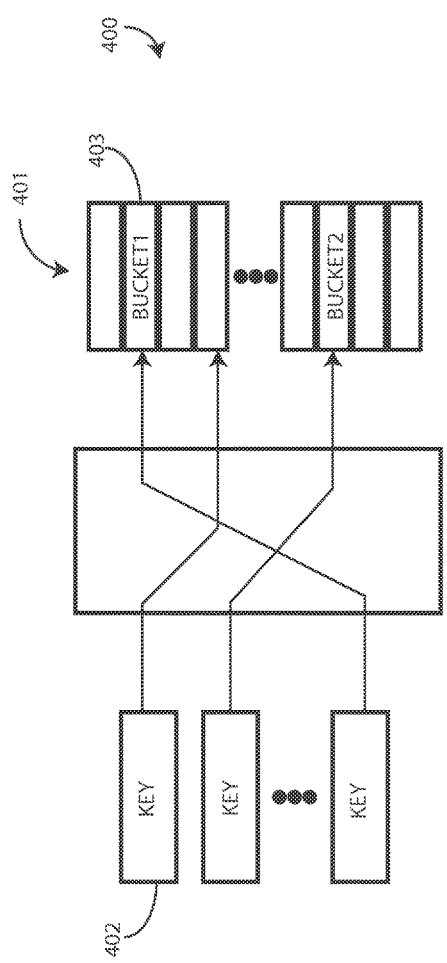
FIG. 4 illustrates one explanatory hash table in accordance with one or more embodiments of the disclosure.

The key cache of the local key material repository 306, 307, the key cache of the intermediate key material repository 302,303,304,305, and the key cache of the master key material repository 301 can each be organized as a hash table. Turning now to FIG. 4, illustrated therein is such a hash table 400, which is configured as an array of buckets 401. The hash key 402 is derived from the identification of the content (108) and the uniform resource identifier used by the master key material repository 301 for requesting a vendor key 320 from the vendor key management server 318. Each element in a bucket list 403 identifies unique key material. In one embodiment, each element in a bucket list has the following fields:

Identification of the DRM content protection scheme;
Identification of the content for which a fragment is associated with the key material;
A pointer to the next element, if any, in the current bucket list of the cache hash table;
A pointer to the previous element, if any, in the current bucket list of the cache hash table;
A pointer to the next element, if any, in the list of least recently accessed elements in the entire cache;
A pointer to the previous element, if any, in the list of least recently accessed elements in the entire cache;
The keys used in the protection of the content fragment associated with the key material;

The uniform resource identifier, if applicable, used for validation of the key material by the device;
The positional starting time for the content fragment associated with the key material;
The positional ending time for the content fragment associated with the key material;
The timestamp of the absolute time after which the key material is regarded as expired and no longer valid; and
A retention priority value indicating the retention priority of the fragment within the key cache, which guards against automatic removal of key material from a key cache when that key material is associated with higher priority content.

Figure 5:
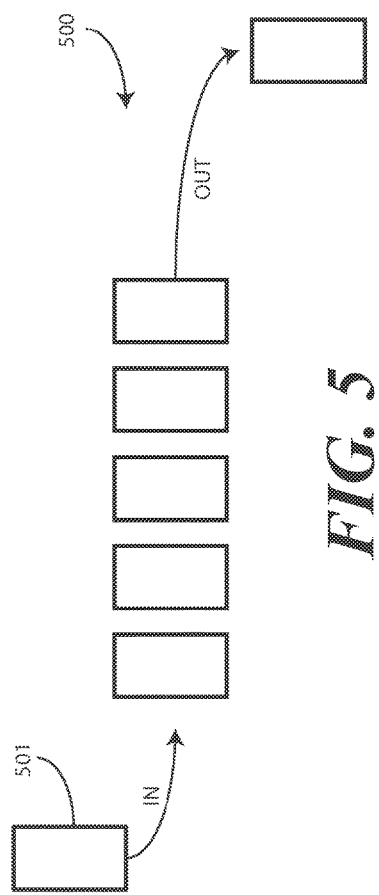
FIG. 5 illustrates one explanatory method in accordance with one or more embodiments of the disclosure.

In one or more embodiments, the vendor cache of the master key material repository 301 is organized as a first-in-first-out queue. Turning now to FIG. 5, illustrated therein is such a queue 500. Each element 501 of the queue 500, in one embodiment, includes the following fields:

Identification of the DRM content protection scheme;
The uniform resource identifiers used by the master key material repository (301) for requesting a vendor key from the vendor key management server of the content provider (118);
The keys used in the generation of the key material; and
The uniform resource identifier, if applicable, used for validation of the key material by the device.

Figure 6:
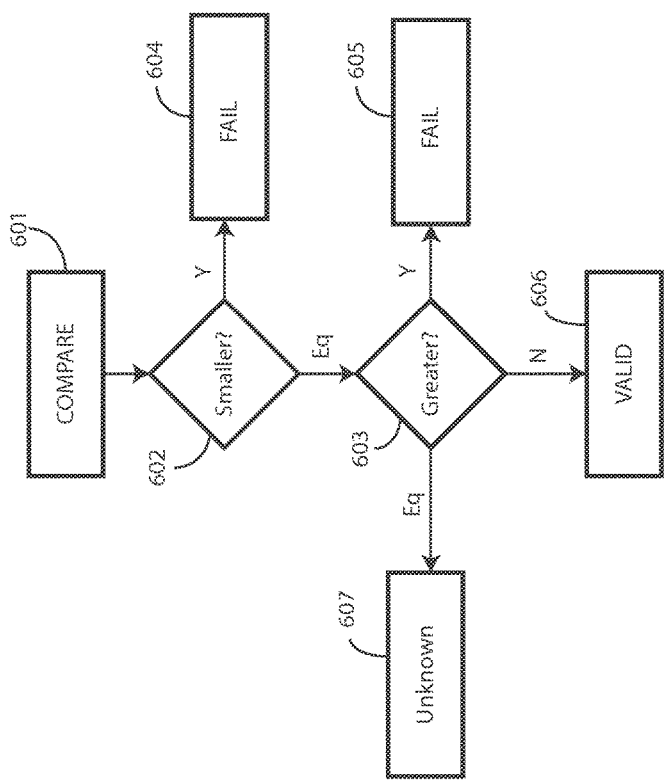
FIG. 6 illustrates one explanatory method in accordance with one or more embodiments of the disclosure.

Using data structures described above, the various repositories in the distributed key management system (300) of FIG. 3 can perform a method to compare requested key material from a subscriber device (109,110) with cached material stored within an immediate repository. Turning now to FIG. 6, illustrated therein is such a method 600. In this method 600, it should be noted that the method 600 will generally yield one of three results: That the requested key material is "smaller than" the cached key material; That the requested key material is "equal to" the cached key material; or That the requested key material is "greater than" the cached key material.

Turning now to the steps of the method 600, at step 601 the method 600 compares requested key material with the cached key material in the element in the buckets (401). The comparison of step 601 determines if the requested key material is "smaller," "equal to," or "greater than" the cached key material. One embodiment of making this determination is configured as a series of sub-steps illustrated in FIG. 7.

Figure 7:
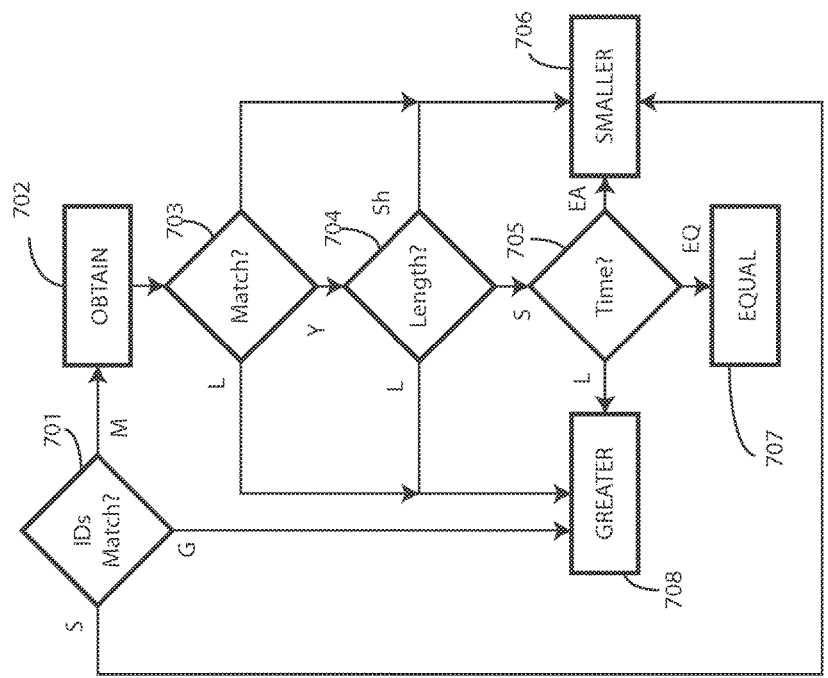
FIG. 7 illustrates one explanatory method in accordance with one or more embodiments of the disclosure.

Turning now to FIG. 7, illustrated therein are sub-steps of step (601). In particular, at decision 701, the method decides whether the identifications of the content protection schemes of the requested key material and the cached key material match. If they match, the method moves to step 702 where the minimum common length of the identifications of the content of the requested key material and the cached key material are obtained.

At decision 703, the method decides whether the minimum common length of the identifications of the content of the cached key material and the requested key material, which were obtained at step 702, match through the minimum common length. If they do, the method moves to decision 704 to determine whether the identifications of the content have the same length, a longer length, or a shorter length.

Where the identifications have the same length, as determined at decision 704, the method moves to decision 705 to determine whether the positional start time of the fragment associated with the requested key material is earlier than the positional start time of the fragment associated with the cached element. If so, the method moves to step 706 and concludes that the requested key material is "smaller than" the cached key material.

If the decision at decision 705 is that the positional start time of the fragment associated with the requested key material is equal to the positional start time of the fragment associated with the cached key material, the method moves to step 707 and concludes the requested key material is "equal to" the cached key material. If the decision at decision 705 is that the positional start time of the fragment associated with the requested key material is later than the positional start time of the fragment associated with the cached key material, the method moves to step 708 and concludes that the requested key material is "greater than" the cached key material.

Returning to decision 704, where the identification of the content of the requested key material has a longer length than does the identification of the content of the cached key material, the method proceeds to step 708 and concludes the requested key material is "greater than" the cached key material. However, where the identification of the content of the requested key material is determined at decision 704 to have a shorter length than the identification of the content of the cached key material, the method proceeds to step 706 and concludes that the requested key material is "smaller than" the cached key material.

Returning to decision 703, where the method determines whether the identifications of the content of the cached key material and the requested key material, which were obtained at step 702, match through the minimum common length, one of two things can occur. Where the length of the identification of the content of the requested key material is longer than the length of the identification of the content of the cached key material, the method moves to step 708 and concludes that the requested key material is "greater than" the cached key material. Otherwise, the method moves to step 706 and concludes that the requested key material is "smaller than" the cached key material.

Returning to decision 701, recall from above that this decision 701 decides whether the identifications of the content protection schemes of the requested key material and the cached key material match. Where the identification of the content protection scheme of the requested key content material is greater than that of the cached key material, the method moves to step 708 and concludes that the requested key material is "greater than" the cached key material. Otherwise, the method moves to step 706 and concludes that the requested key material is "smaller than" the cached key material.

From these determinations, the remainder of the method shown in FIG. 6 can be completed. Turning now back to FIG. 6, where the sub-steps of step 601 shown in FIG. 7 conclude that the requested key material is "smaller than" the cached key material, which is shown illustratively as decision 602, the method moves to step 604 and indicates a search failure because the requested key material is not in the key cache.

Figure 8:
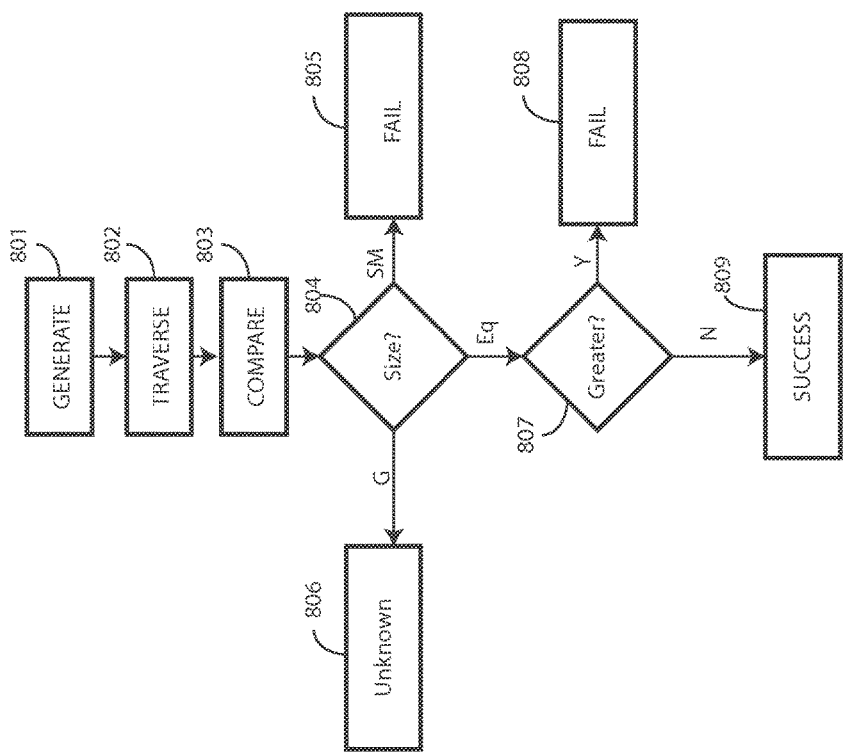
FIG. 8 illustrates one explanatory method in accordance with one or more embodiments of the disclosure.

By contrast, where the sub-steps of step 601 shown in FIG. 7 conclude that the requested key material is "equal to" the cached key material, the method moves to decision 603 and determines if the timestamp of the current time is greater than timestamp of the absolute time after which the key material is regarded as expired and no longer valid. Where this is the case, the method moves to step 605 and indicates a search failure because the requested key material is in the key cache but is no longer valid. Where this is not the case, the method moves to step 606 and concludes the requested key material is in the key cache and is still valid.

Where the sub-steps of step 601 shown in FIG. 7 conclude that the requested key material is "greater than" the cached key material, the method moves to step 607 where an unknown state is reached. In the unknown state, the method will continue to search the buckets (401). The method by which this search occurs is shown in FIG. 8. Note that in one or more embodiments the method of FIG. 8 can be configured to be the same as that illustrated and described above with reference to FIG. 7.

Turning now to FIG. 8, at step 801 the method generates a hash key (402) for requested key material. At step 802, the method traverses the buckets (401) searching for the requested key material. For each cache element in the buckets (401) the method first compares the requested key material with the cached key material in the element in the bucket list at step 803. At decision 804, the method determines if the requested key material is "smaller than," "equal to," or "greater than" the cached key material.

Where the requested key material is "smaller than" the cached key material, the method moves to step 805 and indicates a search failure because the requested key material is not in the key cache. By contrast, where the requested key material is "equal to" the cached key material, the method moves to decision 807 and determines if the timestamp of the current time is greater than timestamp of the absolute time after which the key material is regarded as expired and no longer valid. Where this is the case, the method moves to step 808 and indicates a search failure because the requested key material is in the key cache but is no longer valid. Where this is not the case, the method moves to step 809 and concludes the requested key material is in the key cache and is still valid. Where the requested key material is "greater than" the cached key material, the method moves to step 806 where an unknown state is reached. In the unknown state, the method will continue to search the buckets (401).

Figure 9:
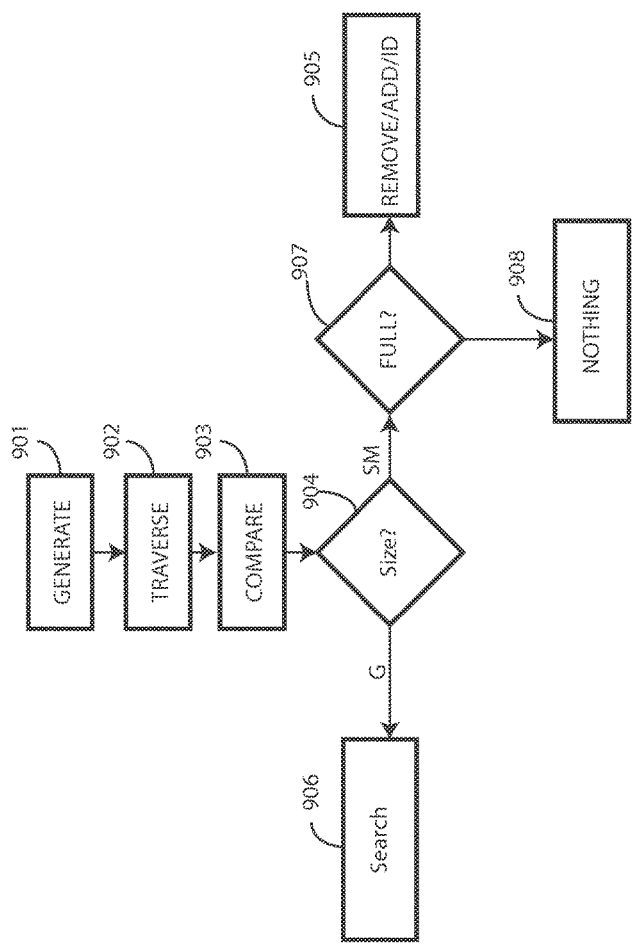
FIG. 9 illustrates one explanatory method in accordance with one or more embodiments of the disclosure.

Turning now to FIG. 9, illustrated therein is a method for adding requested key material to a key cache. At step 901 the method generates a hash key (402) for requested key material. At step 902, the method traverses the buckets (401) searching for an insertion point for the requested key material. For each cache element in the buckets (401) the method first compares the requested key material with the cached key material in the element in the bucket list at step 903. At decision 904, the method determines if the requested key material is "smaller than," "equal to," or "greater than" the cached key material.

Where the requested key material is "greater than" the cached key material, the method moves to step 906 and continues to search for an insertion point in the buckets (401). Where the requested key material is "smaller than" the cached key material, the method moves to decision 907 to determine if the key cache is full. If the key cache is full, the method moves to step 905 and removes the cache element that is the least recently accessed element in the key cache and that has a retention priority value lower than a pre-determined threshold. Traversal of the list of least recently accessed elements, in decreasing order of recent access, may be necessary to locate an element having a retention priority value than the threshold. The method then adds the requested key material in the bucket list, immediately preceding the cache element used in the comparison. The method further identifies the newly added element as the most recently accessed element in the key cache. If the requested key material is equal to the cached key material, the method does nothing at step 908.

One advantage of embodiments of the disclosure is that at the intermediate servers (102,103,104,105) can anticipatorily or predictively "pre-populate" the intermediate key material repositories (302,303,304,305) to help ensure a seamless experience for the user. This provides advantages over prior art systems where keys are added to caches based upon demand.

In prior art systems, data flow between components is reactive or just-in-time population of a key cache with newly requested key material that is not already in the cache. The population process requires interaction directly with all levels of parent key material repository to the master key repository. This requires intensive interaction across the network, and latency is introduced in the processing of a request from a device.

Embodiments of the current disclosure solve this problem by providing predictive or proactive pre-population of intermediate key material repositories (302,303,304,305) by the intermediate servers (102,103,104,105). Where the content being delivered to a subscriber device (109,110) includes multiple fragments, this pre-population of the intermediate key material repositories (302,303,304,305) ensures the key material is in the intermediate key material repositories (302,303,304,305) prior to requests being received from child servers or subscriber devices (109,110). Accordingly, embodiments of the disclosure honor requests for key material more quickly, yielding an improved consumer experience in the delivery of key-protected content.

It should be noted that pre-population of key material can occur in any of the local key material repositories (306,307), the intermediate key material repositories (302,303,304, 305), and even the master key material repository (301) to pull key material from a content provider (118). For discussion purposes, illustrative embodiments will employ pre-population at intermediate key material repositories (302, 303,304,305). Some systems will employ pre-population only at intermediate key material repositories (302,303,304, 305). This is true because the number of local key material repositories (306,307) is likely to be higher than other key material repositories. Moreover, in some embodiments pre-population of key material in every local key material repository 306,307 could introduce unnecessary network traffic and processing overhead. This is particularly true if some of the local key material repositories 306,307 never receive requests from subscriber devices (109,110).

In one or more embodiments, the intermediate key material repositories (302,303,304,305) provide a preferred host for requests for pre-population of key material. An intermediate key material repository (302,303,304,305) can therefore request the pre-populated key material from the master key material repository (301), thereby also pre-populating the key material in the master key material repository (301). A subsequent, reactive population of a local key material repository (306,307) key cache can be fulfilled through a single request-response interaction with the local key material repository parent repository. Turning now back to FIG. 3, embodiments of pre-population methods will be examined in more detail.

Figure 10:
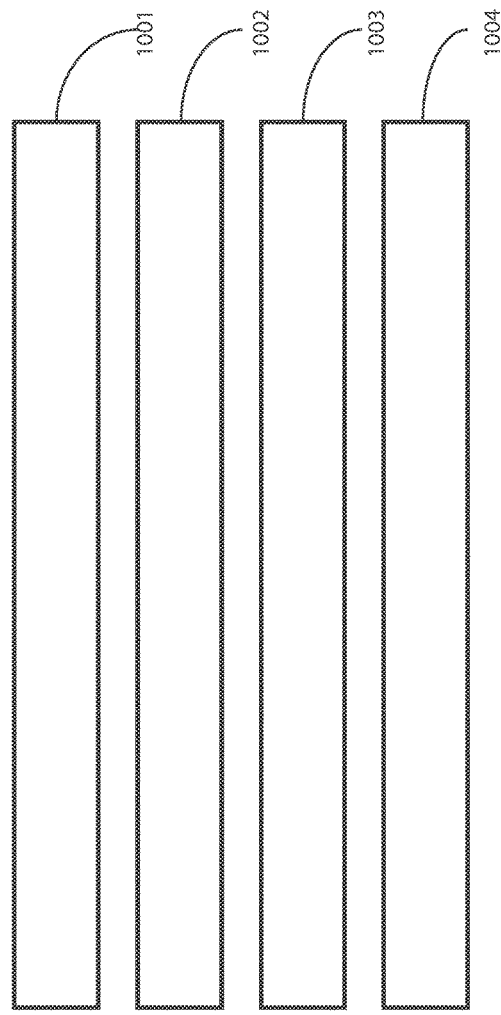
FIG. 10 illustrates explanatory content portions and corresponding key material in accordance with one or more embodiments of the disclosure.
Figure 10:
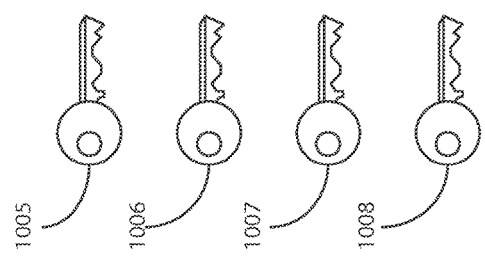

When new content (108) is made available imminently for consumer consumption, the management system 117 may request that each intermediate key material repository 302, 303,304,305 pre-populate its key cache with key material for all fragments of the new content (108). For example, suppose a new movie entitled "Patents are Fun" is to be made available to subscriber devices 109,110. Further suppose the movie is of duration 01:47:58 and has fragments each representing a fixed and maximum positional span of 30 minutes. Turning briefly to FIG. 10, the four fragments 1001,1002,1003,1004 are shown. Each of the fragments 1001,1002,1003,1004, which are protected by unique key material 1005,1006,1007,1008, are the following:

First Fragment 1001: Positional starting time 0 seconds, positional ending time 1,800 seconds;

Second Fragment 1002: Positional starting time 1,801 seconds, positional ending time 3,600 seconds;

Third Fragment 1003: Positional starting time 3,601 seconds, positional ending time 5,400 seconds; and Fourth Fragment 1004: Positional starting time 5,401 seconds, positional ending time 6,477 seconds.

Turning now back to FIG. 3, in one embodiment the management system 117 sends four pre-population requests 330 for all four fragments (1001,1002,1003,1004) of the content (108). One request is sent for each of the intermediate key material repositories 302,303,304,305. An example, time-based data flow sequence is as follows:

Intermediate key material repository 304 receives the pre-population request 330 and forwards the request to intermediate key material repository 302. Similarly, intermediate key material repository 305 receives the pre-population request 330. If its key cache is full, it removes the four bucket list elements representing the four least recently accessed elements that have priority retention values below a configured threshold value. It then forwards the request to the master key material repository 301.

The master key material repository 301 processes the pre-population request 330 from intermediate key material repository 305 by obtaining four sets of keys from the vendor key repository of the vendor key management server 318, thereby creating a set of four instances of unique key material, storing the four instances of key material in its key cache and the relational database management system, and sending the four instances of key material to intermediate key material repository 305. The intermediate key material repository 305 can then store the four instances of key material in its key cache and can send an acknowledgement response to the management system 117.

Meanwhile, intermediate key material repository 302 receives the pre-population request 330 from intermediate key material repository 304. Intermediate key material repository 302 removes any necessary elements from its key cache, and forwards the request to the master key material repository 301. The master key material repository 301 processes the pre-population request from intermediate key material repository 302 by sending its cached four instances of key material to intermediate key material repository 302. Intermediate key material repository 302 receives the four instances of key material from the master key material repository 301, stores the four instances in its key cache, and sends an acknowledgement response to the management system 117. Intermediate key material repository 302 also sends an acknowledgement response to intermediate key material repository 304.

Intermediate key material repository 304 then receives the four instances of key material from intermediate key material repository 302, stores the four instances in its key cache, and sends an acknowledgement response to the management system 117.

The description above was for video on demand content. In other embodiments, the newly released content (108) will be live content. Live content may have runtime duration of days, weeks, or months. Hundreds of live content fragments may become available in the future, but it is not practical to pre-populate the intermediate key material repositories 302, 303,304,305 with hundreds of instances of key material that may not be accessible until months from now. Continuing, repeated requests for pre-population of the next instance of key material, however, would afford the same pre-population benefits for a live content that are realized through pre-population of a video on demand content.

Illustrating by example, suppose the Patent Channel is currently encoding live event, and the encoding commenced six hours ago. The live content has fragments, with each representing a fixed positional span of twenty minutes. Turning briefly to FIG. 11, two fragments 1101,1102 are shown. Each of the fragments 1101,1102, which are protected by unique key material 1103,1104, are the following:

First Fragment 1101: Positional starting time 21,600 seconds, positional ending time 22,799 seconds; and Second Fragment 1102: Positional starting time 22,800 seconds, positional ending time 23,999 seconds.

Turning now back to FIG. 3, during the time span for the current fragment of the live content, the management system 117 may request pre-population of the next fragment of the live content. In one or more embodiments, time-based data flow sequence for pre-population of key material for the next fragment of the live content is similar to the example time-based data flow sequence for pre-population of key material for the four fragments of the video on demand content described above. However, rather than requesting all fragments as in the video on demand embodiment, for live content only one instance of key material is requested:

Intermediate key material repository 305 also receives the pre-population request from the management system 117. If its key cache is full, it removes a bucket list element representing the least recently accessed element that has a priority retention value below a configured threshold value. It then forwards the request to the master key material repository 301. The master key material repository 301 processes the pre-population request from intermediate key material repository 305 by obtaining one set of keys from the vendor key management server 318, creating an instance of unique key material, storing the instance of key material in its key cache and the relational database management system, and sending the instance of key material to intermediate key material repository 305.

Intermediate key material repository 304 receives the pre-population request from the management system 117 and forwards the request to intermediate key material repository 302. Intermediate key material repository 302 receives the pre-population request from intermediate key material repository 304, removes any necessary element from its key cache, and forwards the request to the master key material repository 301. The master key material repository 301 processes the pre-population request from intermediate key material repository 302 by sending its cached instance of key material to intermediate key material repository 302.

Intermediate key material repository 305 receives the instance of key material from the master key material repository 301, stores the instance in its key cache, and sends an acknowledgement response to the management system 117. Intermediate key material repository 302 receives the instance of key material from the master key material repository 301, stores the instance in its key cache, and sends an acknowledgement response to intermediate key material repository 304. Intermediate key material repository 304 receives the instance of key material from intermediate key material repository 302, stores the instance in its key cache, and sends an acknowledgement response to the management system.

Another variation of the theme for pre-population of key material for live content is that the management system 117 need not be the requestor for pre-population of key material for live content. When an intermediate key material repository 302,303,304,305 receives a just-in-time request for key material for a live content fragment from a subscriber device 109,110, the intermediate key material repository 302,303, 304,305 can determine the positional time span of the requested, current fragment, calculate the positional starting and ending times for the next fragment of the live content, and pre-populate its key cache with key material for the next fragment.

Illustrating by example, suppose the Patent Channel is currently encoding live event, and the encoding commenced six hours ago. The live content has fragments, with each representing a fixed positional span of twenty minutes. Turning briefly to FIG. 12, two fragments 1201,1202 are shown. Each of the fragments 1201,1202, which are protected by unique key material 1203,1204, are the following:

First Fragment 1201: Positional starting time 21,600 seconds, positional ending time 22,799 seconds; and Second Fragment 1202: Positional starting time 22,800 seconds, positional ending time 23,999 seconds.

Turning now back to FIG. 3, during the time span for the current fragment of the live content, the intermediate key material repository 302,303,304,305 may receive a just-in-time request for the current fragment of the live content. An example, time-based data flow sequence for pre-population of key material for the next fragment of the live content is as follows:

Intermediate key material repository 305 receives the just-in-time request from local key material repository 307. Its key cache is full, and it removes a bucket list element representing the least recently accessed element that has a priority retention value below a configured threshold value. It then forwards the request to the master key material repository 301. The master key material repository 301 processes the pre-population request from intermediate key material repository 305 by obtaining one set of keys from the vendor key management server 318, creating an instance of unique key material, storing the instance of key material in its key cache and the relational database management system, and sending the instance of key material to intermediate key material repository 305. Intermediate key material repository 305 receives the instance of key material from the master key material repository 301, stores the instance in its key cache, and sends the instance of key material to local key material repository 307.

Intermediate key material repository 305 analyzes the just-in-time request it processed. That request has a positional starting time of 21,600 seconds and a positional ending time of 22,799 seconds, representing a positional time span of 1,200 seconds. The next fragment for the live content in the processed request is calculated to have a positional starting time of 22,800 seconds and a positional ending time of 23,999 seconds. Its key cache is still full, and it removes a bucket list element representing the least recently accessed element that has a priority retention value below a configured threshold value. It then constructs a pre-population request for the next fragment and forwards the newly constructed request to the master key material repository 301.

The master key material repository 301 processes the pre-population request from intermediate key material repository 305 by obtaining one set of keys from the vendor key cache, creating an instance of unique key material, storing the instance of key material in its key cache and database, and sending the instance of key material to intermediate key material repository 305. Intermediate key material repository 305 receives the instance of key material from the master key material repository 301 and stores the instance in its key cache.

Figure 13:
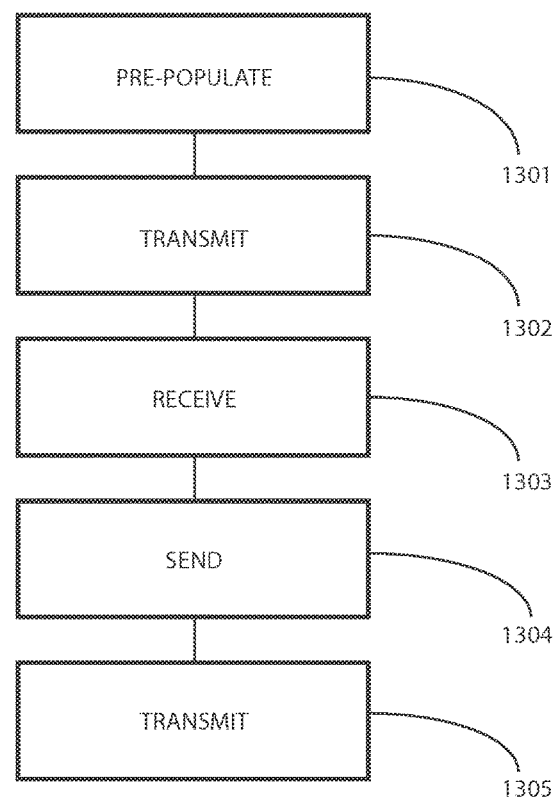
FIG. 13 illustrates one explanatory method in accordance with one or more embodiments of the disclosure.
Figure 14:
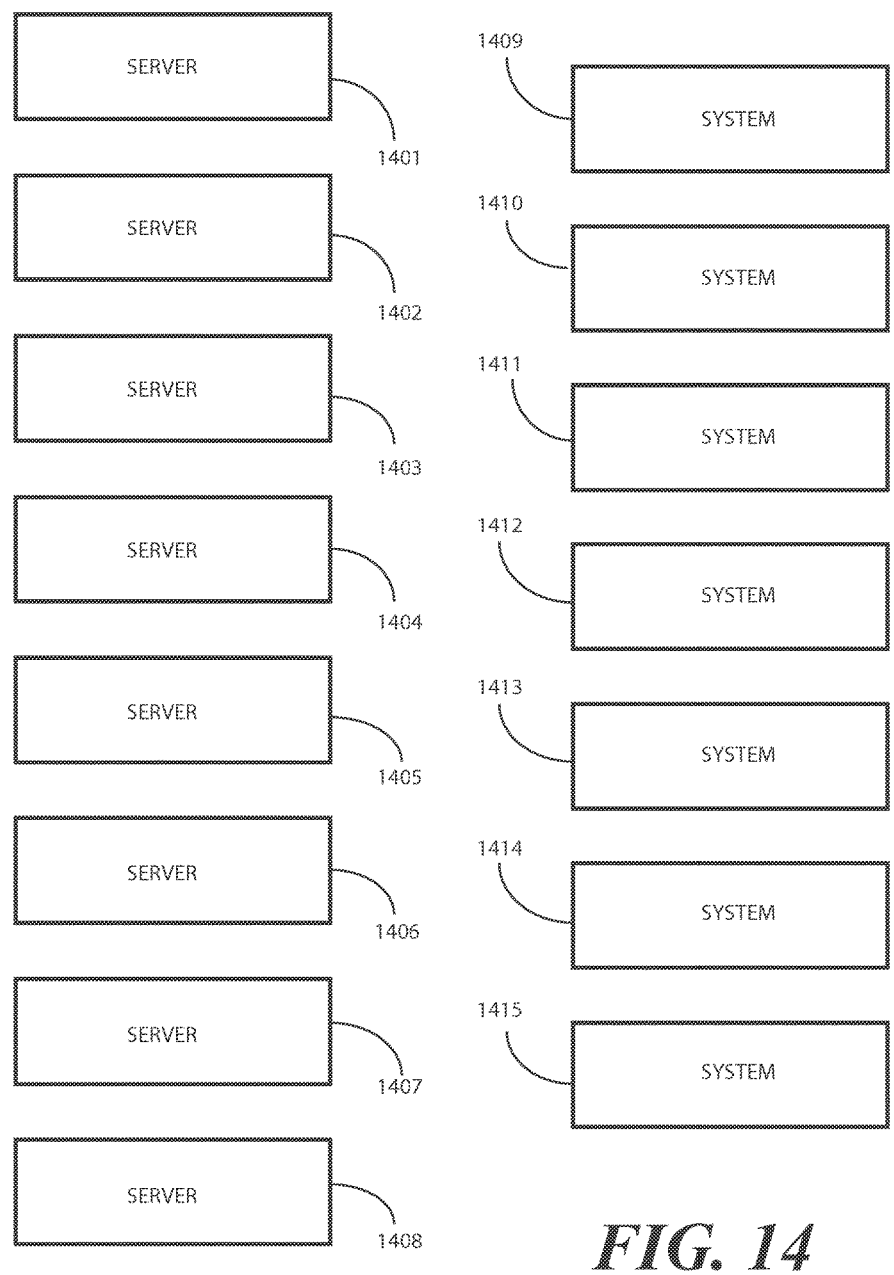
FIG. 14 illustrates various embodiments of the disclosure.

Turning now to FIG. 13, illustrated therein is one method suitable for use with the distributed key management system (300) of FIG. 3. At step 1301, the method pre-populates, using one or more processors of a server, a material repository with one or more digital rights management keys corresponding to portions of content. In one embodiment, step 1301 occurs without requests for the portions of content from child servers. For example, where the step 1301 is occurring in an intermediate server, the pre-populating can occur without requests for the portions of the content from local servers operable with the intermediate server.

At step 1302, the method can include transmitting a pre-population request to a parent key material repository for the one or more digital rights management keys. Where step 1302 is occurring in an intermediate server, this step 1302 can include transmitting the pre-population request to a master server.

At step 1303, the method can further include receiving one or more digital rights management keys and storing the one or more digital rights management keys in a key material repository. At step 1304, the method can include sending an acknowledgement to the parent server. At step 1305, the method can include transmitting one or more digital key rights management keys to one or more of the local servers in response to a request from the one or more local servers.

As described above, architecture for a hierarchical repository of key material for digital rights management is provided. The architecture can include a single tier of local key material repositories, one or more tiers of intermediate key material repositories, and a single master key material repository in one or more embodiments. A method for using the architecture transfers key material between the repositories of the hierarchical repository of key material for digital rights management.

In one or more embodiments, a method for background population of a cache of vendor keys for just-in-time generation of key material is provided. A method of searching cache key material is provided. A method of efficient addition of key material into a cache of key material is provided. A method for pre-population of key material for new video on demand content in the intermediate key material repository, as directed by a management system is provided.

In one or more embodiments, a method for pre-population of key material for live content in the intermediate key material repository, as directed by a management system is provided. A method for pre-population of key material for live content in the intermediate key material repository, as induced by the intermediate key material repository is provided.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An intermediate server in a distributed key management system, comprising: one or more processors; and
   an intermediate key material repository to store digital rights management key material received from a master key material repository, wherein the intermediate key material repository is organized with a hash table, wherein the master key material repository is divided into at least a first vendor cache to receive vendor keys from a first vendor and a second vendor cache to receive other vendor keys from a second vendor;
   the intermediate server coupled between the master server and a local server;
   the local server to deliver content to one or more subscriber devices;
   the intermediate server to pre-populate the intermediate key material repository with key material corresponding to fragments of the content prior to the fragments of the content being requested by the one or more subscriber devices;
   the content comprising video on demand content, the hash table configured as an array of buckets, where each element in a bucket list identifies unique key material having associated therewith a retention priority value indicating a retention priority guarding against automatic removal of the unique key material from the bucket.

2. The intermediate server of claim 1, the intermediate server to pre-populate the intermediate key material repository with the key material corresponding to all the fragments of the content, wherein a hash key for the hash table is derived from an identification of the content and a uniform resource identifier used for requesting a vendor key for the content.

3. The intermediate server of claim 1, the content comprising live content.

4. The intermediate server of claim 3, the intermediate server to pre-populate the intermediate key material repository with at least one instance of key material without a request for the at least one instance of key material from the one or more subscriber devices.

5. The intermediate server of claim 3, the intermediate server to continue to pre-populate the intermediate material key repository with additional key material corresponding to additional fragments of the content.

6. The intermediate server of claim 1, the intermediate server to pre-populate the intermediate key material repository with the key material corresponding to the fragments of the content in response to a pre-population request received from a management system.

7. The intermediate server of claim 1, the intermediate server to forward a pre-population request to at least one parent server.

8. The intermediate server of claim 7, the at least one parent server comprising the master server of the distributed key management system.

9. The intermediate server of claim 1, the intermediate server to search a key cache of the intermediate key material repository prior to pre-populating the intermediate key material repository with the key material corresponding to the fragments of the content.

10. A distributed key management system, comprising:
- a master server operable with a master key material repository for receiving key material from a vendor key management server, wherein the master key material repository is divided into at least a first vendor cache to receive vendor keys from a first vendor and a second vendor cache to receive other vendor keys from a second vendor;
- one or more local servers operable with local key material repositories to deliver both the vendor keys and the other vendor keys with content from the first vendor and the second vendor, respectively, to one or more subscriber devices;
- a plurality of intermediate servers, each operable with an intermediate key repository organized with a hash table; and
- a management system, the management system to pre-populate one or more intermediate key repositories with one or more digital rights management keys selected from the first vendor cache and the second vendor cache corresponding to fragments of content prior to the fragments of content being requested by a subscriber device; the content comprising video on demand content, the hash table configured as an array of buckets, where each element in a bucket list identifies unique key material having associated therewith a retention priority value indicating a retention priority guarding against automatic removal of the unique key material from the bucket.

11. The distributed key management system of claim 10, the management system to pre-populate the one or more intermediate key repositories differently based upon a vendor of content.

12. The distributed key management system of claim 11, the management system to pre-populate more of the one or more digital rights management keys when the content is video on demand content than when the content is live content.

13. The distributed key management system of claim 12, the management system to pre-populate all digital rights management keys when the content is the video on demand content.

14. The distributed key management system of claim 10, the one or more digital rights management keys received from a content provider.

* * * * *